(12) United States Patent
Lentz (10) Patent No.: US 11,782,264 B1
(45) Date of Patent: Oct. 10, 2023

(54) OPTICAL FLIGHT MOTION SIMULATOR TARGET AXES

(71) Applicant: Government of the United States as Represented by the Secretary of the Air Force, Wright-Patterson AFB, OH (US)

(72) Inventor: Joshua K Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 350 days.

(21) Appl. No.: 17/061,525

(22) Filed: Oct. 1, 2020

Related U.S. Application Data (60) Provisional application No. 62/908,632, filed on Oct. 1, 2019.

(51) Int. Cl.
*G02B 26/08* (2006.01)
(52) U.S. Cl.
CPC ................ *G02B 26/0891* (2013.01)
(58) Field of Classification Search
CPC .................................................. G02B 26/0891
USPC ....................................................... 359/196.1
See application file for complete search history.

(56) References Cited

U.S. PATENT DOCUMENTS

| | | | |
|---|---|---|---|
| 8,358,400 B2 | 1/2013 | Escuti | |
| 8,610,853 B2 | 12/2013 | Escuti | |
| 9,195,092 B2 | 11/2015 | Escuti et al. | |
| 9,684,094 B2 | 6/2017 | Jiang | |
| 9,689,087 B1 | 6/2017 | Li et al. | |
| 9,726,783 B2 | 8/2017 | Perrier-Cornet | |
| 9,733,467 B2 | 8/2017 | Kim et al. | |
| 10,331,009 B2 | 6/2019 | Dmitriev | |
| 2012/0002049 A1* | 1/2012 | Fry | F41G 7/008 348/148 |
| 2020/0026058 A1* | 1/2020 | Maryfield | G02B 26/0891 |

OTHER PUBLICATIONS

Oh, C.; Kim, J.; Muth, J. F.; Escuti, M. J. ; "A new beam steering concept: Risley gratings", Proc. SPIE 7466, Advanced Wavefront Control: Methods, Devices, and Applications VII, 2009, 74660J; doi: 10.1117/12.828005; https://doi.org/10.1117/12.828005.
Rumpf, R. C.; Pazos, J. J.; Digaum, J. L.; Kuebler, S. M.; Spatially variant periodic structures in electromagnetics. Philosophical Transactions of the Royal Society A: Mathematical, 2015, 373, 20140359.
Digaum, J. L.; Sharma, R.; Batista, D.; Pazos, J. J.; Rumpf, R. C.; Kuebler, S. M.; "Beam-bending in spatially variant photonic crystals at telecommunications wavelengths", Proc. SPIE 9759, Advanced Fabrication Technologies for Micro/Nano Optics and Photonics IX, 975911, 2016.
Pazos, J. J.: Digitally manufactured spatially variant photonic crystals. Phd. University of Texas at El Paso. 2010.

(Continued)

*Primary Examiner* — Euncha P Cherry
(74) *Attorney, Agent, or Firm* — AFMCLO/JAZ; James F. McBride (57) ABSTRACT

The systems and methods provided herein are directed to a flight motion simulator. The target axes are replaced by a system of Risley pairs. Light is projected to the unit under testing at a range of angles by rotating elements within the Risley pairs.

15 Claims, 8 Drawing Sheets

(56) References Cited

OTHER PUBLICATIONS

Liu, L.; Khan, H. A.; Li, J.; Hillier, A. C.; Lu, M.; A strain-tunable nanoimprint lithography for linear variable photonic crystal filters. Nanotechnology 2016, 27, 295301.

Liu, X.; Da, Y.; Xuan, Y.; Full-spectrum light management by pseudo-disordered moth-eye structures for thin film solar cells. Optics Express A824. 2017, 25. 17.

Beaulieu, M. R.; Hendricks, N. R.; Watkins, J. J.; . (2014). Large-Area Printing of Optical Gratings and 3D Photonic Crystals Using Solution-Processable Nanoparticle/Polymer Composites. ACS Photonics.

Sun, T.; Xu, Z.; Xu, H.; Zhao, W.; Wu, X.; Liu, S.; Ma, Z.; He, J.; Liu, S.; Peng, J.; Photonic crystal structures on nonflat surfaces fabricated by dry lift-off soft UV nanoimprint lithography. Journal of Micromechanics and Microengineering. 2013, 23, 125002.

Calafiore, G.; Fillot, Q.; Dhuey, S.; Sassolini, S.; Salvadori, F.; Prada, C.; Munechika, K.; Peroz, C.; Cabrini, S.; Piña-Hernandez, C.;. Printable photonic crystals with high refractive index for applications in visible light. Nanotechnology. 2016. 27, 115303.

\* cited by examiner

OPTICAL FLIGHT MOTION SIMULATOR TARGET AXES

CROSS-REFERENCE TO RELATED APPLICATIONS

This application claims the benefit of and priority to U.S. Provisional Application Ser. No. 62/908,632, entitled "Optical Flight Simulator Target Axes," filed on 1 Oct. 2019, the entirety of which is incorporated by reference.

STATEMENT OF GOVERNMENT INTEREST

The invention described herein may be manufactured and used by or for the Government of the United States for all governmental purposes without the payment of any royalty.

BACKGROUND AND BRIEF DESCRIPTION

Flight motion simulators (FMS) provide simulated input in order to test various devices in flight. Two classical configurations of FMS exist: 3-axis and 5-axis. A 3-axis FMS provides pitch, yaw and roll control of a test article, ideally with rotations centered on the test article gimbal (if one exists). A 5-axis FMS couples a 3-axis FMS with two additional axes to allow a scene or target to be moved around a hemispherical region centered on the 3-axis rotational origin. The outer two axes are often referred to as "target axes" and provide an azimuth and elevation control. In the 5-axis scenario, a test article with optics can be physically manipulated such that the body position and motion represents body flight and the optics can look in a direction different than the body orientation. In this case, a scene projected from the target axes is incident on the test article and the projection angle can be varied by moving the target axes.

The proposed invention is most suited for presenting optical information to bench-mounted test articles having gimbaled sensors and moderate fields of regard. This allows gimbal testing and tracking tests over a moderate field of regard that may include line of sight effects outside of the detector field of view. The conditions would be limited such that standoff distance is bounded within a test system limit and therefore optical element sizes remain reasonable.

FMS construction is generally a combination of hydraulic and electrical and a 5-axis system can easily weigh multiple tons, and have a volume of roughly 12 feet in each dimension (1700 ft$^3$). The cost of such a system is in the millions of dollars and additional space is required for hydraulic pumps, piping, electrical supply and controllers. The system is limited in angular motion by collision limitations of axes and floor, mounts, or other physical obstacles.

Presented is an invention that provides a much more compact method of accomplishing a subset of functions performed by the two target axes of a 5-axis FMS. This invention provides a substantially more compact solution with high angular accuracy and high-speed performance. In this case, a series of angularly varying elements, broadly referred to as "Risley elements," are used to provide a changing angle of incidence to the test article while maintaining a fixed field of view of the projector. The system changes the field of regard through simple axial rotation of the Risley elements, which have a much lower rotational inertia than the motion simulator itself In this case, power requirements are significantly reduced. System cost is expected to be substantially lower than for the two target axes of the traditional FMS. The invention is intended as an alternative to FMS target axes when space and/or budget are limited and very large angles between optical axis and test article body are not needed.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to a flight motion simulator. The target axes are replaced by a system of Risley pairs. Light is projected to the unit under testing at a range of angles by rotating elements within the Risley pairs.

For testing navigation systems in collaborative devices in a hardware-in-the-loop environment, the traditional FMS approach would be too costly and use too much space to allow the testing of, for example, five items (assumed nearest neighbors above, below, left and right included). In one particular implementation, replacing the target axes with optical elements as described would allow five test stations to be created in a floor area of approximately 12 feet by 35 feet (420 ft$^2$).

In place of the two target axes, the system uses Risley elements such as Risley prisms, gratings, or crystals. Risley prisms are basic wedge prisms that have been used for decades to provide optical pointing and steering functions. Typically, they exist in pairs and are rotated independently of each other, allowing energy to be steered over a hemisphere of space, with the limitation in angular precision being established by the precision of rotation of the prisms. The steering function is a result of the refraction-induced angular change of light passing through the prism. The magnitude of angular change is fixed for a given prism but the direction of the output light can be adjusted by rotating the prism.

Figure 1:
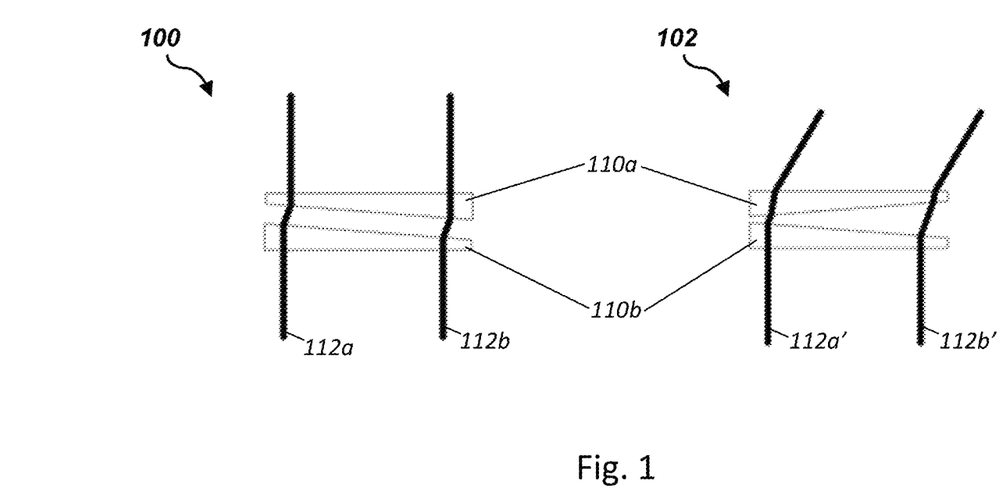
FIG. 1 is an diagrammatic view of a pair of Risley prisms in accordance with an aspect of the present disclosure.

FIG. 1 shows two configurations 100 and 102 of a pair of Risley prisms 110a and 110b, showing a minimum and maximum angular deflection of the pair. The first configuration 100 shows the angular positioning of the first prism 110a to be opposite that of the second prison 110b such that the thinnest area of one prism is angularly aligned with the thickest area of the other. In some implementations (and with respect to the Equations below), this configuration may be thought of as 0° angular position for both prisms 110a, 110b. As shown, the ray lines 112a and 112b trace a path of refraction after passing through both prisms that is parallel to their incident path: this configuration 100 does not cause angular deflection of the beams passing therethrough.

The second figuration 102 shows the angular positioning of the first and second prisms to be the mirrored, such that their thickest and thinnest portions are aligned rotationally. This configuration 102 can be thought of as 0° angular position for the first prism 110a and 180° angular position for the second prism 110b. The ray lines 112a' and 112b' now trace a path of refraction that is maximally angled relative to the incident path.

Figure 2:
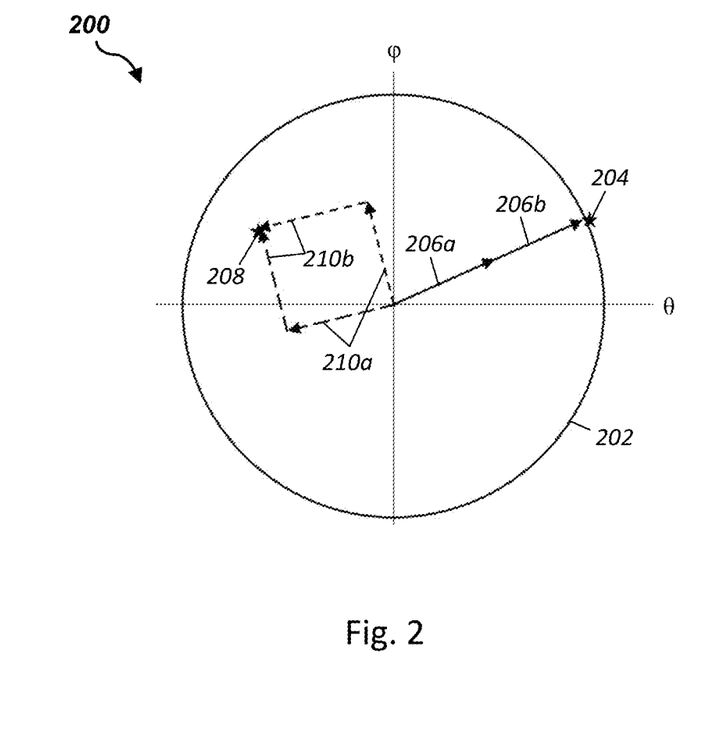
FIG. 2 is a graphical representation of the range of angles that can be generated by rotation of the elements of a Risley pair in accordance with an aspect of the present disclosure.

With paired Risley prisms or other pairs of Risley elements, the entire angular range from on-axis to twice the angular shift of a single element can be accomplished. The function of Risley prisms, and the range of possible angles, is illustrated by the graph 200 of FIG. 2. Here, two axes represent the altitude angle φ and the azimuth angle θ at which a beam is deflected from an initial angle of incidence of 0° relative to the optical axis. For the case of a point on the outer circle 202 defining the range of pointing of the Risley prisms, a point 204 in the angular space can be reached with exactly one solution. This is accomplished by having both vectors 206a and 206b, each representing one of the two Risley elements, have the same axial position such that the angular change of light is doubled. In the case of a generic point 208 within the pointing range and not at the axial (0° angle) position of the pointing, two complementary solutions exist, shown as 210a and 210b. The two solutions correspond to reversing the order of prism rotation (i.e. in solution 1, prism 1 is rotated by x and prism 2 is rotated by y, and for solution 2, prism 1 is rotated by y and prism 2 is rotated by x). The vector sum of the prism pointing in angle space is the same for both.

The last case of the Risley elements is for axial steering. Whereas a point on the outer circle has exactly one solution and a point in the interior, non-zero region has two solutions, the zero point has infinite solutions. To arrive at the zero point, the choice of rotation on one element is arbitrary and the second element is required to be rotated in exactly the opposite direction (180° angle relative to the position of the first element) such that the vector sum of the two is zero. Configuration 100 in FIG. 1 illustrates this case.

Equations 1 and 2, shown below, indicate the total angle of diffraction in altitude φ and in azimuth θ that results from two Risley elements positioned at angles α and β when each individual element diffracts the incident beam by ω:

$$\varphi = \omega^*(\sin \alpha + \sin \beta) \tag{1}$$

$$\theta = \omega^*(\cos \alpha + \cos \beta) \tag{2}$$

Figure 3:
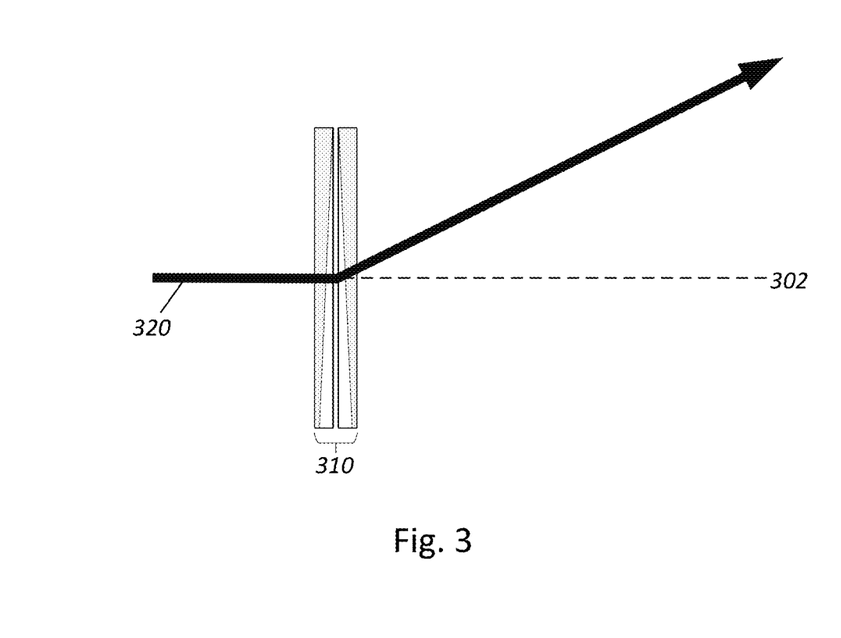
FIG. 3 is a cross-section view of a single Risley pair deflecting a beam path.

As such, any angle between 0 and 2ω is possible along one of the two transverse directions to the optical axis, either φ or θ, and then the other angle is constrained to fall within the circle illustrated in FIG. 3, according to the following Equations:

$$(\varphi^2 + \theta^2) \leq 4\omega^2 \tag{3}$$

$$\theta \leq \sqrt{(4\omega^2 - \varphi^2)} \tag{4}$$

In the particular example of one angle, such as the altitude angle φ, being equal to the maximum angle 2ω (twice the diffraction angle of each individual Risley element), the diffraction perpendicular to it would be approximately zero. This is the case if both α and β are 0° to 90°, orienting both elements to diffract in the positive horizontal or vertical direction, respectively.

The function of a pair of Risley elements can be accomplished via any optical structure that results in a fixed angular offset of light which can then be rotated as described. In addition to Risley prisms as described above, Risley gratings can also be used for this purpose. In the case of Risley gratings, diffraction is used to generate the angular offset by sending all of the light into a particular nonzero diffracted order, typically in a polymerized grating form. This technique allows a very lightweight solution to Risley functions, reducing the demand on rotation stages and associated motor control as well as eliminating the chromatic aberration associated with a refractive prism. Because a Risley grating will typically polarize the projected light as the light is diffracted, these elements should be used under conditions suitable for polarized input. For example, light projection may need to be increased to make up for a loss of beam intensity when polarizing the light. If an alternative method is used to avoid the loss of intensity, such as the use of circular polarization, the system configuration would need to take such modification of the source into account in its testing protocols.

An additional optical element for the angular deviation of light which can act as a Risley element is a particularly designed photonic crystal structure. Spatially variant photonic crystals may have the necessary beam diverting properties described herein, as well as collimating light; in some implementations, the photonic crystals may be able to reasonably divert beam paths at angles greater than that of conventional Risley prisms.

The implementations described herein use multiple pairs of these Risley elements (for example, prisms, gratings, and/or photonic crystals), each of which will herein be described as a "Risley pair." Each Risley pair may represent any appropriate device having the features described herein, most notably the ability to rotate the elements relative to each other to adjust the angle of refraction of a beam interacting with the pair. One of ordinary skill may recognize devices having the properties of a Risley pair other than those described above. In some implementations, one Risley pair used in a particular device may not be the same type of optical element as another Risley pair.

FIG. 3 illustrates one such Risley pair 310 diverting a first beam path 320 away from its incident optical axis 302. As shown and described, the particular angle of deflection will depend on the rotational position of both elements making up the Risley pair 310.

As described and illustrated, the target motion simulator configuration is composed of at least two Risley pairs. A first Risley pair is located after the output of the scene projection collimator (which must have an appropriate distance to its exit pupil location) and is used to shift the light outward as needed to the next Risley pair. This next Risley pair is then used to direct the light to the unit under test (UUT) at a desired angle, potentially much larger than it would have occurred for the raw collimator output.

Figure 4:
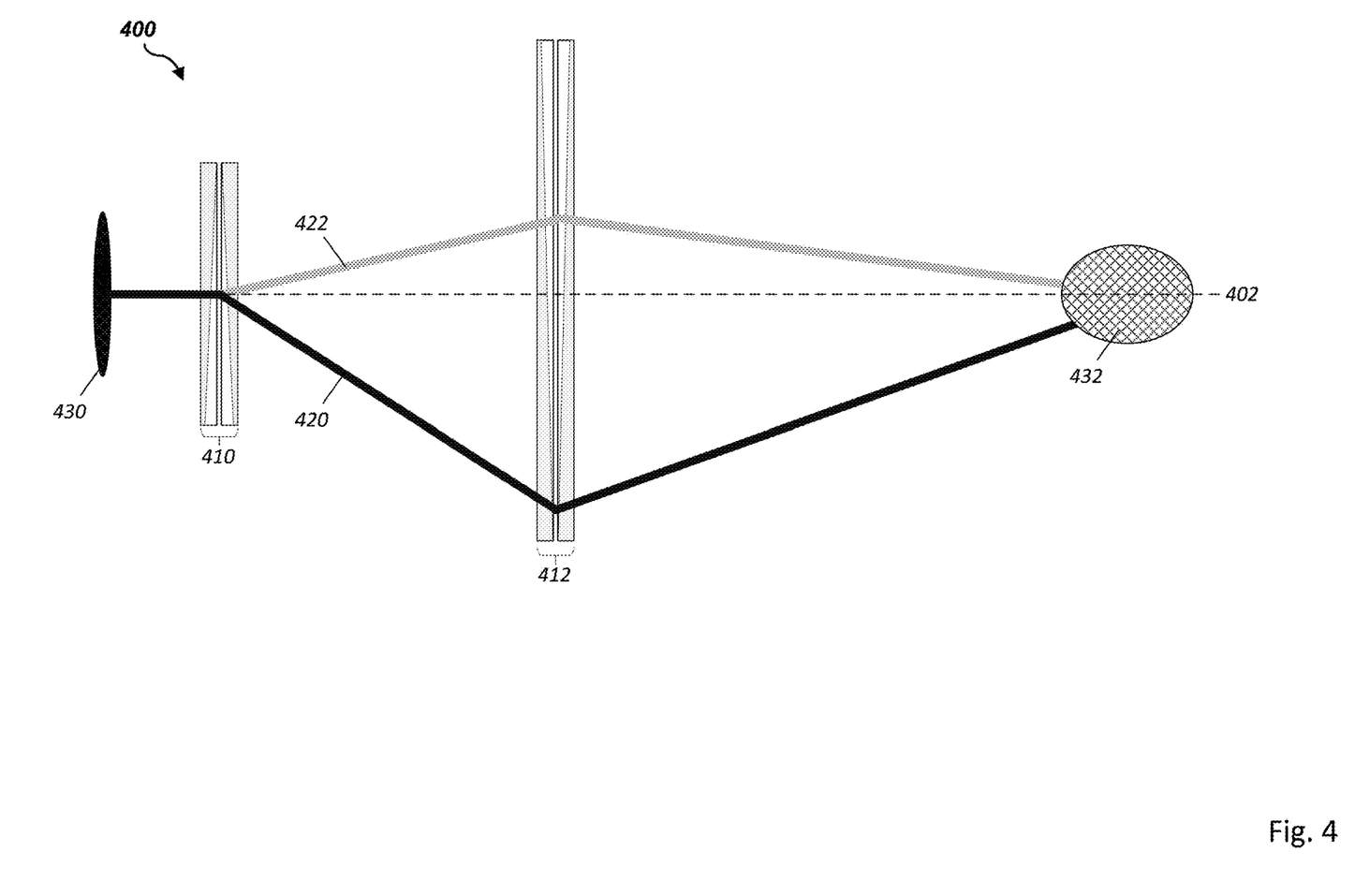
FIG. 4 is a cross-section view of two Risley pairs deflecting different beam paths.

FIG. 4. shows one such configuration 400 of two Risley pairs 410 and 412. The beam paths 420 and 422 enter the first Risley pair 410 along the optical axis 402, which is understood to be between the projector 430 and the UUT 432. The configuration of the first Risley pair 410 and the second Risley pair 420 can be chosen to deflect light at the appropriate angle for the simulation, so that projected light is received at an angle within the field of view that is other than the position of the projector 430.

Figure 5:
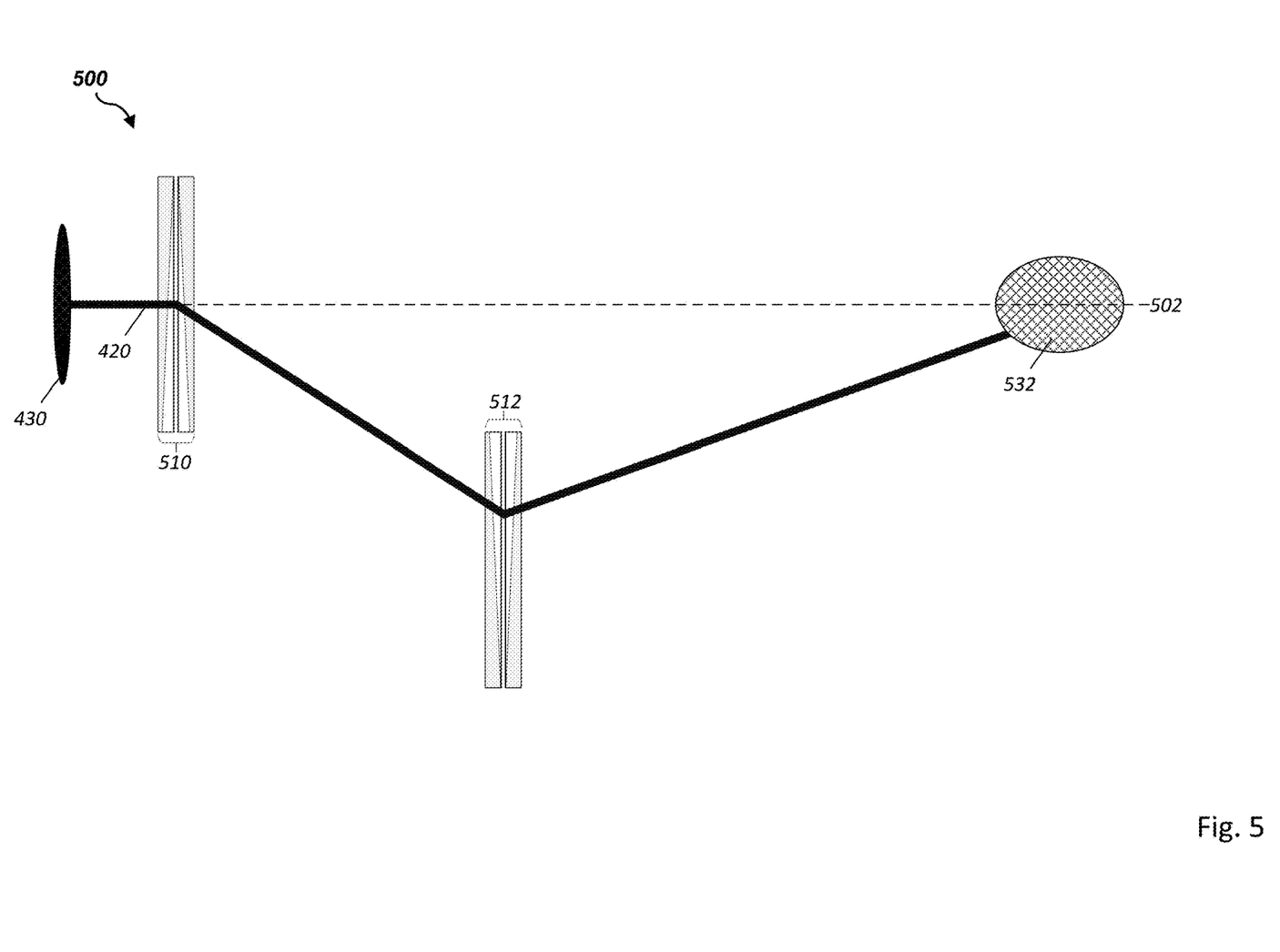
FIG. 5 is a cross-section view of two Risley pairs deflecting a beam path.

An alternative example of a system 500 with two Risley pairs is shown in FIG. 5. Here, a smaller Risley pair 512 is used as the second pair to divert the deflected light back to the UUT 532. In some implementations, this second Risley pair 512 may be similar in size and extent to the first Risley pair 510, even though this may fail to cover the entire area over which the first pair 510 can deflect the beam. Instead, the second pair 512 may be adjusted in accordance with the angles needed at a given time. In other embodiments, multiple smaller elements may be disposed at different locations relative to the angular azimuth and altitude of the deflected beam to be used for different desired beam paths. One of ordinary skill may recognize different ways in which the Risley pair 512 may be positioned and repositioned as necessary, such as automated movement using a robotic arm or other device capable of translating the position of the Risley pair relative to the field of view.

Figure 6:
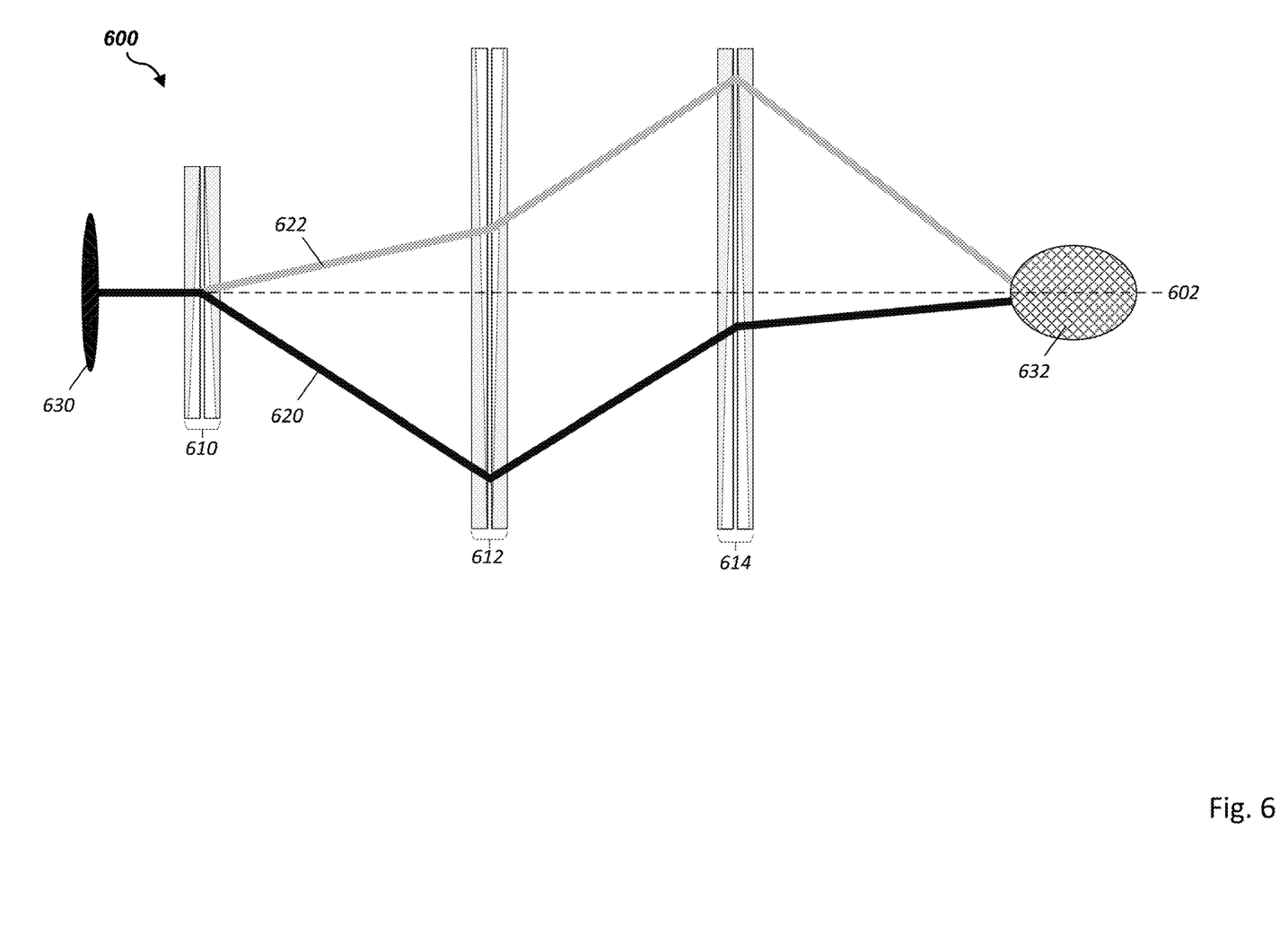
FIG. 6 is a cross-section view of three Risley pairs deflecting different beam paths.

Additional Risley pairs may be needed depending on the collimator exit pupil distance and other system requirements and limitations. Because the optical path length for the maximum angle to the UUT is much longer than the direct on-axis distance, additional Risley pairs may be used in the system to intentionally increase the path length for the on axis energy such that the exit pupil location for any field angle to the UUT remains constant. Such a configuration 600 is illustrated in FIG. 6, in which the length of the beam path 620 is lengthened to match the beam path 622, even though the desired final angle of deflection on the UUT 632 for the first beam path 620 is much closer to the optical path 602 than is the second beam path 622. While two Risley pairs 610 and 612 are sufficient to allow any angle within a certain range, as shown, a third Risley pair 614 is required for a configurations in which the path length of different angles are the same.

One of ordinary skill will recognize that specific choices of configuration for Risley elements, and indeed for the system as a whole, will depend on the nature of the units under test as well as the constraints of the testing facilities. For example, taking advantage of the benefits of the systems herein described may involve manufacturing each Risley element on a rigid substrate, substantially transparent to the wavelengths acting as projected signals. The responsiveness and flexibility of the system may depend on the precision and reliability of the devices used to independently rotate the Risley elements.

Figure 7:
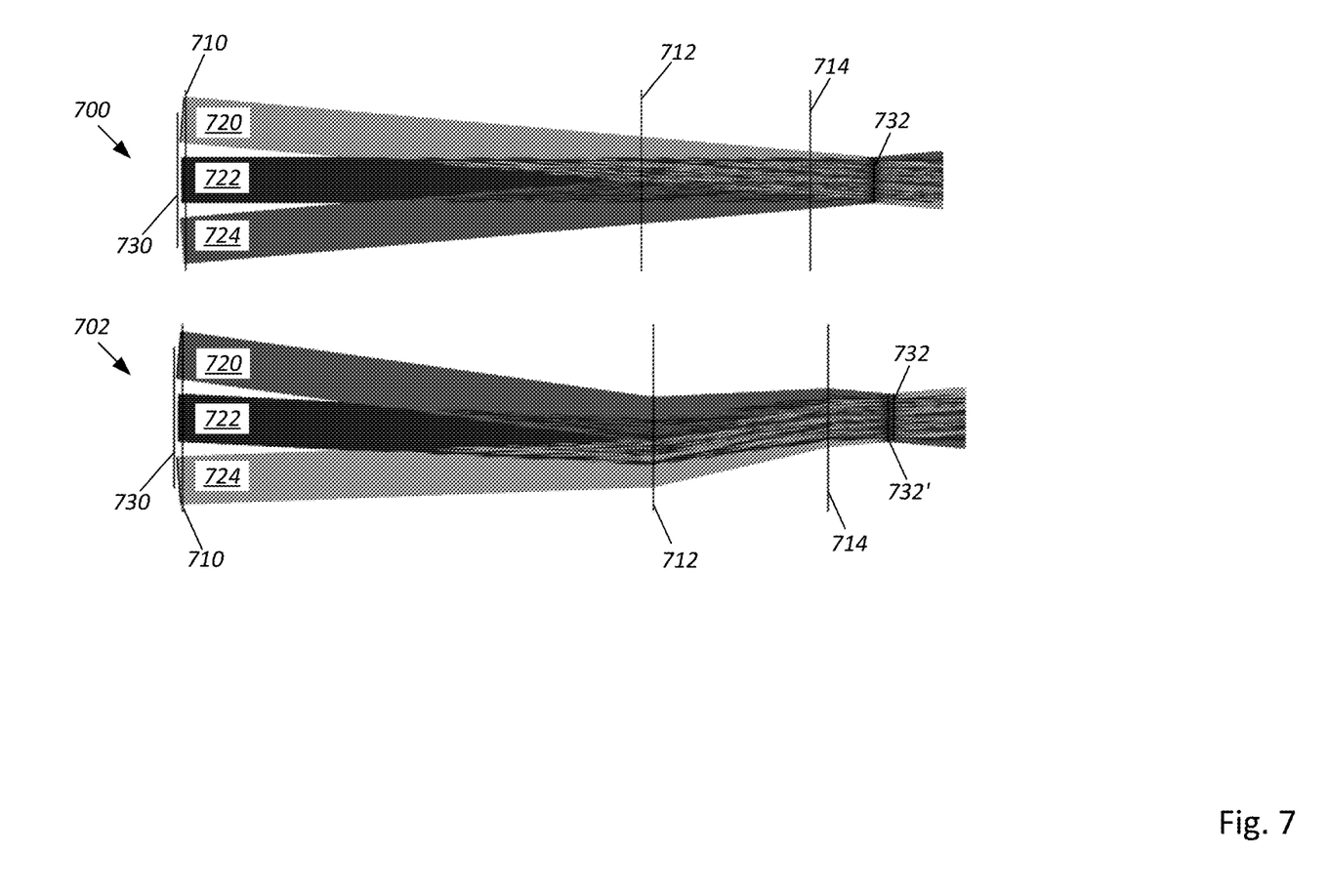
FIG. 7 is a diagrammatic illustration of two different configurations of Risley pairs showing a change in multiple beam paths based on the change in configuration.
Figure 8:
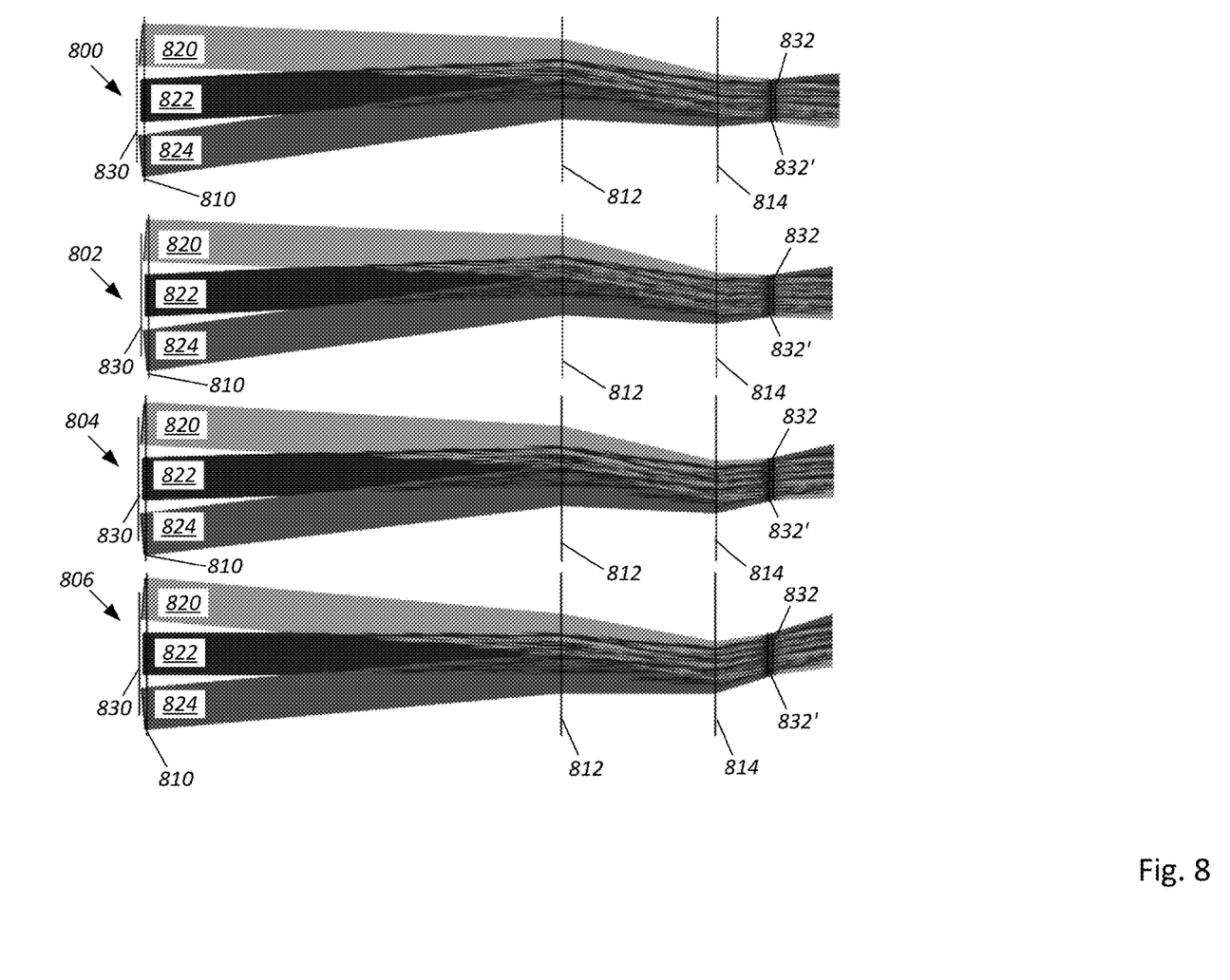
FIG. 8 is a diagrammatic illustration of four different configurations of Risley pairs, each showing the alteration of multiple beam paths based on a particular angular position of Risley elements.

FIGS. 7 and 8 are diagrammatic illustrations of different configurations of three Risley pairs, illustrating how beam paths exiting a collimator may be deflected by implementations of the disclosed systems.

FIG. 7 shows two such configurations 700 and 702 for three Risley pairs. After exiting a collimator lens 730, the beams 720, 722, and 724 pass through a first Risley pair 710, a second Risley pair 712, and a third Risley pair 714, before coalescing at a distance marked as an exit pupil 732. The first configuration 700 represents a 0° deflection by the Risley pairs, and so the exit pupil location 732 is determined by the optical properties of the medium and the collimator lens 730. In contrast, the second configuration 702 represents the Risley pairs rotated to deflect more than 0° and therefore accommodating a wider initial angle for the projected beams. However, as shown, the exit pupil location may no longer be at its previous position 732 as determined by the lens 730 alone, but may instead be shifted to a new position 732' due to the different optical configuration.

FIG. 8 shows four configurations, each of which involves a different angular rotation for the Risley pairs. Again, after exiting a collimator lens 830, the beams 820, 822, and 824 pass through a first Risley pair 810, a second Risley pair 812, and a third Risley pair 814, before coalescing at a distance marked as an exit pupil 832', which may vary from the exit pupil 832. In the first configuration 800, the collimator optical axis is presented to the UUT at 0°, the situation that would occur without the use of the invention. However, here there are intermediate angles to shift the exit pupil plane closer to the collimator than it otherwise would occur so that the exit pupil plane can remain fixed for other field angles. Configuration 802 shows the collimator optical axis at 2.5° to the UUT with the collimator's fixed field of view. Configurations 804 and 806 show the scenarios of the collimator optical axis at 7.5° and 12.5° to the UUT, respectively. In all four cases, the exit pupil remains fixed and the collimator appears to have rotated around the UUT. Various factors, including the standoff distance from the test article and the entrance pupil diameter, can allow for larger angles than that illustrated here.

Because of the rotational symmetry of the collimator, UUT and Risley elements, the invention can simulate a changed azimuth and/or elevation angle of the collimator output, accomplishing the same function as the outer axes of a FMS in scenarios where the inner three axes are significantly limited in their range of motion. In the case of this invention, the limit of angular change is dependent on the maximum Risley element steering angles and Risley element diameters.

Although illustrated in terms of collimated light, it will be understood that non-collimated light, or other signals conveyed by means of optical transmission such as different spectra of EM waves, may be manipulated by means of Risley elements as described.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A motion simulator, comprising:
a first Risley pair disposed along a mechanical axis between a projector and a unit under testing, the first Risley pair configured to deflect electromagnetic energy projected along a path at a first angle;
a second Risley pair disposed and configured to further deflect the projected electromagnetic energy projected from the first angle, at a second angle, the second angle being directed inward toward the unit under testing, and the second angle being predetermined by a testing protocol associated with the unit under testing, said first Risley pair and said second Risley pair each comprising two or more Risley prisms, each of said two or more Risley prisms being independently rotatable.

2. The motion simulator of claim 1 wherein said electromagnetic energy is light.

3. The motion simulator of claim 2, wherein the light is collimated light.

4. The motion simulator of claim 2, further comprising a third Risley pair;
wherein the first, second, and third Risley pairs are disposed and configured to collectively deflect light such that the first Risley pair deflects light along the first angle, the second Risley pair deflects light along the second angle, and the third Risley pair deflects light along a third angle, the third angle being directed inward toward the unit under testing, and the third angle being predetermined by the testing protocol associated with the unit under testing, and the first, second and third angles being such that the length of a path traveled by the light is predetermined by the testing protocol associated with the unit under testing, said third Risley pair comprising two or more Risley prisms, each of said two or more Risley prisms being independently rotatable.

5. The motion simulator of claim 4, wherein one or more of the Risley prisms are rotatable to one or more rotational positions based on the third angle.

6. The motion simulator of claim 2, wherein one or more of the Risley prisms are rotatable-to one or more rotational positions based on the second angle.

7. The motion simulator of claim 2, wherein the light is not collimated light.

8. The motion simulator of claim 2, wherein the light is monochromatic.

9. The motion simulator of claim 2, wherein the light is polychromatic, broadband or multi-spectral.

10. The motion simulator of claim 2 wherein said Risley pairs comprise prisms, gratings and/or photonic crystals.

11. The motion simulator of claim 4 comprising an automated mechanical device non-axially for moving, the second pair of Risleys into the optical path based on the first angle of deflection of the first pair of Risleys.

12. The motion simulator of claim 1 wherein said unit comprises a tracking and/or navigation system.

13. The motion simulator of claim 1 comprising an automated mechanical device for non-axially moving, the second pair of Risleys into the optical path based on the first angle of deflection of the first pair of Risleys.

14. A method of using motion simulator of claim 1 comprising determining an angle within a field of regard for light projected from said projector along a path to said unit under testing; adjusting configurations of said plurality of Risley pairs in order to deflect the light from the path and redirect the light to the unit under testing at the determined angle.

15. The method of claim 14, wherein the plurality of Risley pairs each comprise two Risley prisms, and wherein adjusting the configurations comprises rotating one or more of the Risley prisms to one or more rotational positions based on the determined angle.

* * * * *